US005480578A

United States Patent [19]

[11] Patent Number: 5,480,578

Hirsch et al.

[45] Date of Patent: Jan. 2, 1996

[54] DETERGENT ADDITIVE FOR DETERGENTS CONTAINING A FABRIC SOFTENER

[75] Inventors: Rüdiger Hirsch, Rhineland; Reinhard Hähn, Lower Bavaria; Norbert Schall, Upper Bavaria, all of Germany

[73] Assignees: Sud-Chemie AG, Munich; Dalli-Werke, Stolberg, both of Germany

[21] Appl. No.: 205,935

[22] Filed: Mar. 3, 1994

[30] Foreign Application Priority Data

Mar. 3, 1993 [DE] Germany .......................... 43 06 665.8

[51] Int. Cl.[6] .......................... C11D 3/0802; C11D 3/12; C04B 33/02

[52] U.S. Cl. .......................... 252/174.25; 252/174.13; 106/416; 106/467; 106/468; 106/485; 427/215

[58] Field of Search .......................... 252/174.25, 174.13; 106/416, 467, 468, 485; 427/215

[56] References Cited

U.S. PATENT DOCUMENTS

| | | | |
|---|---|---|---|
| 4,339,335 | 7/1982 | Wixon | 252/8.8 |
| 4,632,768 | 12/1986 | Atkinson | 252/8.8 |
| 4,820,439 | 4/1989 | Rieck | 252/174.25 |
| 5,061,397 | 10/1991 | Goodman | 106/468 |

FOREIGN PATENT DOCUMENTS

| | | |
|---|---|---|
| 26529 | 8/1981 | European Pat. Off. . |
| 385748 | 9/1990 | European Pat. Off. . |
| 452016 | 10/1991 | European Pat. Off. . |
| 0452016 | 10/1991 | European Pat. Off. . |
| 3833648 | 5/1990 | Germany . |
| 3942066 | 6/1991 | Germany . |
| 3943019 | 7/1991 | Germany . |
| 2121843 | 1/1984 | United Kingdom . |

*Primary Examiner*—C. Melissa Bonner
*Attorney, Agent, or Firm*—Scott R. Cox

[57] ABSTRACT

A detergent additive for commercial detergents (softener agents) that contain fabric softeners is described. This additive is based on agglomerates of a smectic laminar silicate coated with divided particles. This detergent additive is characterized in that the agglomerates are at least partially coated with particles of a cation exchanger that will pass through a screen with a mesh of about 45 µm and have an average particle size of less than about 10 µm, where the amount of cation exchanger particles is about 2 to 30 wt % (based on the dry weight of the uncoated agglomerates). This detergent additive may be used in the conventional detergent formulations.

5 Claims, No Drawings

DETERGENT ADDITIVE FOR DETERGENTS CONTAINING A FABRIC SOFTENER

This invention concerns a detergent additive for detergents that contain a fabric softener (softener agent) which is based on agglomerates of a smectic layered silicate coated with finely divided particles. This invention also concerns a detergent or softener agent containing such an additive.

BACKGROUND OF INVENTION

In traditional laundry operations, a conventional detergent containing nonionic and anionic surfactants is used for cleaning the laundry. Cationic surfactants have been used to achieve improved fabric softness. Since cationic and anionic surfactants are inactivated in a wash bath due to the formation of an insoluble compound, a fabric softener must be added separately in the rinse cycle. Softener agents contain fabric softener additives that are not inactivated by the other ingredients of the detergent and therefore can be part of the formulation of the detergent.

The most conventional fabric softener detergent additives are swellable, natural smectic layered silicates such as montmorillonite and hectorite. The use of such layered silicates in detergents has already been described, for example, in British Patent GB A 2,121,843. Such a detergent additive contains agglomerates of finely divided bentonite with a particle size of less than 74 μ m that are agglomerated to form particles approximately 150 to 2000 μm in size which may have a moisture content of 8 to 13%. The agglomerates contain approximately 1 to 5 wt % of a binder in the form of a water glass solution. The detergents produced using such detergent additives contain an anionic surfactant or a nonionic surfactant or a mixture of these surfactants, plus a builder or a builder mixture based on phosphates, preferably polyphosphates, or nitrilotriacetates and carbonates, such as sodium carbonate or sodium bicarbonate. In addition, zeolites such as zeolite A may also be used as the builders. However, the zeolites are not bound to the bentonite aggregates but instead are added only during the process of formulating the detergent.

European Patent Application EP A 385,748 also discloses detergent additives for detergents containing fabric softeners based on agglomerates of a smectic layered silicate such as bentonite enclosed in a finely divided white pigment in order to increase the whiteness. The agglomerates contain additives of nonionic surfactants that are supposed to increase the adhesion of the finely divided white pigment to the agglomerates.

Detergents produced using such detergent additives may contain the same ingredients as the detergents produced according to British Patent GB A 2,121,843. They also include zeolites, but these zeolites are not bound to the bentonite agglomerates. Thus, hard water is not softened before penetrating into the bentonite agglomerates.

European Patent Application EP-A 26,529 discloses detergent formulations that contain quaternary ammonium compounds and tertiary amines in addition to the usual surfactants. Some of these detergent formulations contain zeolites, but even if the latter are present, they are not used to coat agglomerated bentonite.

European Patent Application EP 164,797 discloses fabric softener agglomerates based on smectic layered silicates that are coated with dispersants such as quaternary ammonium salts. This composition is supposed to prevent blockage of automatic washing machines.

U.S. Pat. No. 4,339,335 discloses a detergent formulation that contains, in addition to the usual ingredients, zeolite particles that are attached to the surface of builder particles (sodium carbonate, etc.) with the help of nonionic surfactants. These are essentially granules consisting of sodium carbonate, nonionic surfactants, a coating of zeolite and optionally quaternary ammonium compounds.

German Patent Application DE-A 3,943,019 discloses a granular detergent additive that contains 20 to 45 wt % of a layered silicate such as bentonite, 15 to 20 wt % finely crystalline synthetic zeolite, 0 to 5 wt % water-soluble alkali salts from the class of sulfates, carbonates and phosphates, 0 to 7 wt % polymer acrylic acid salts and 0 to 20 wt % nonionic surfactants. These ingredients are used to prepare an aqueous batch that is then spray dried. No coating of dry bentonite granules with zeolite is disclosed.

German Patent Application DE-A 3,942,066 discloses the production of a granular detergent additive that contains 30 to 90 wt % of a layered silicate, 1 to 40 wt % finely crystalline synthetic zeolite and 0 to 30 wt % water-soluble alkali salts from the class of sulfates, carbonates and silicates, where the zeolite is homogeneously distributed in the granules and is not at the surface of the bentonite granules.

German Patent Application DE-A 3,833,648 discloses a process for producing particulate detergents or detergent additives, whereby swellable clays in particulate form are injected into the spray cone of an aqueous slurry of detergent ingredients and the mixture is dried by hot gases. Again, the zeolite used in this process is not on the surface of clay agglomerates.

SUMMARY OF INVENTION

This invention is based on the problem of providing an agglomerated detergent additive that is mechanically stable in dry form and will still swell readily and disintegrate in a wash bath with a high water hardness.

This invention thus concerns a detergent additive of the type defined initially which is characterized in that the agglomerates are at least partially surrounded with particles of a cation exchanger that will pass through a screen with a mesh of 45 μm and have an average particle size of less than 10 μm, where the amount of the cation exchange particles amount to 2 to 30 wt % (based on the dry weight of the uncoated agglomerates). Preferably an inorganic cation exchanger is used.

The use of a cation exchanger is based on the following conditions: If the smectic layered silicate is used in the form of agglomerates, it is essential for its efficacy for the layered silicate to swell immediately on coming in contact with the water. At the resulting swelling pressure, the agglomerate particles must disintegrate as rapidly as possible into small particles which then disintegrate into primary particles of the layered silicate due to further swelling in water and due to the mechanical motion during the laundry process.

Optimum swelling and dispersion of the agglomerates succeeds when there are no polyvalent cations in the wash bath. Polyvalent cations such as $Ca^{2+}$ or $Mg^{2+}$ which are not present in softened water will delay the swelling of the agglomerates, thus leading to negative effects on dispersibility in hard water and thus to negative effects on the softening action. Since these detergents are used in areas where water with a hardness of up to 40° dH [dH=German degrees of water hardness] occurs, there is a need for assuring optimum swelling and dispersibility of the agglomerates even in areas where the water is very hard.

This effect is not achieved when the particles of the cation exchanger are not bound to the agglomerates of the smectic layered silicate, but are only added during the formulation of the detergent, as is the case with the detergents according to GB-A 2,121,843, EP-A 385,748 and EP-A 26,529.

If the agglomerates coated with the particles of the inorganic cation exchanger come in contact with hard water, they must do so before the hard water penetrates through the layer of the cation exchanger, so the divalent cations in the water are bound by the cation exchanger and thus the water is softened.

The result is that the agglomerates can optimally disintegrate into smaller particles after coming in contact with the softened water. As a result of the improved dispersibility and swellability, there is a significant improvement in the fabric softening properties of the smectic layered silicate.

The amount of cation exchanger particles depends on the hardness of the wash water within the range given above.

The particle sizes indicated above are important inasmuch as the cation exchanger particles will not adhere well to the agglomerates when the particle sizes are larger.

Preferably finely ground bentonite is used as the smectic layered silicate. Bentonite contains montmorillonite as the main mineral. This montmorillonite is a swellable dioctahedral natural layered silicate having the following general formula:

$$Na_{0,66}(OH)_4Si_8(Al_{3,34}.Mg_{0,66})_{O20}$$

Each layer is composed of three elements, and two tetrahedral layers with Si as the central atom enclosing an octahedral layer with Al as the central atom. As this general formula shows, $Al^{3+}$ is partially replaced isomorphically by $Mg^{2+}$. The resulting excess charge is balanced between the layers by $Na^{+}$ and $Ca^{2+}$. Thus, preferably disclosed is sodium bentonite and calcium bentonite.

The bentonite powder preferably has a residual moisture content of approximately 10 wt % and maximum screen tailings of about 30% at a mesh of about 45 μm.

The whiteness of the cation exchanger particles is preferably about 75 to 96%. The whiteness is expressed as R 457 (reflectance at a wavelength of 457 nm, measured with an Elrepho Datacolor 2000) in comparison with a barium sulfate standard.

The residual moisture content of the agglomerates is preferably about 5 to 20 wt %, preferably about 7 to 13 wt %. When the residual moisture content is low, the adhesion of the cation exchanger particles to the agglomerates is poor. However, it is surprising that the cation exchanger particles will also adhere to the agglomerates at the stated, relatively low residual moisture levels even without the use of a binder without resulting in any separation.

The amount of cation exchanger particles is preferably about 7 to 15 wt % (based on the dry weight of the uncoated agglomerates).

The calcium binding power of the cation exchanger should be as high as possible because only a relatively small amount will adhere to the surface of the agglomerates, but on the other hand, as many calcium ions as possible should be bound. Therefore, the cation exchanger preferably has a calcium binding power of about 120 to 200 mg CaO/g. The cation exchanger should also belong to a group of substances that are used in detergents anyway, such as a sodium aluminum silicate, preferably a zeolite. These particles are completely in contact with the agglomerate surface without any unbound particles remaining between the agglomerates. The effect of synthetic sodium silicates with a layered structure is equally good under these conditions.

This invention also concerns a process for producing the detergent additive defined above, which is characterized in that a powdered smectic layered silicate is agglomerated by adding water at a total water content of approximately 20 to 40 wt % (based on the dry powder). The moist agglomerates are preferably dried to a residual moisture content of approximately 5 to 20 wt %, preferably about 7 to 13 wt %. The agglomerates are then mixed with the powdered cation exchanger, essentially without any further size reduction, until the surface of the agglomerates is completely covered with the cation exchanger, whereupon the addition product is dried, if it was not dried previously.

Preferably water which may also contain anionic or nonionic surfactants is used for agglomeration of the smectic layered silicate.

Agglomeration can preferably be carried out by mixing the powder of the smectic layered silicate with water in a forced mixer with a high speed stirrer (for example, in an Eirich mixer). The powder begins to agglomerate at a water content of approximately 20%. Then the moist agglomerates can be dried in a dryer to yield the residual moisture content indicated above. The agglomerates are then sorted to any desired particle size fractions between 0.2 and 2 mm by passing through a vibrating screen.

The powdered cation exchanger is then introduced into the mixer while the mixer is running at a low speed. The cation exchanger powder then covers the surface of the agglomerates and increases their whiteness. After drying the agglomerates, the cation exchanger remains at the surface of the agglomerate particles and thus increases the whiteness of the screened agglomerate. No powder of the cation exchanger remains in the end product after a mixing time of 5 minutes. Due to the irregular surface of the agglomerates, the particles of the cation exchanger adhere very well to the surface of the agglomerate, so there is no subsequent separation effect. When the agglomerates are not dried before adding the powdered cation exchanger, the addition product is dried.

This invention also concerns a detergent containing the detergent additive described above. All other components of the detergent (surfactant, builder, etc.) are the same as with conventional detergents.

This invention is illustrated by the following examples:

EXAMPLE 1

2 kg of a powdered sodium bentonite (total ion exchange capacity 75 meq. (milliequivalents)/100 g, including 65 meq. exchangeable sodium ions per 100 g, water content 10 wt %) were agglomerated in the Eirich mixer at 1500 rpm by adding 300 ml water with a mixing time of 2 minutes. The total water content of the agglomerate was 25 wt %. The agglomerate was dried at a temperature of 100° C. in a drying cabinet over a period of 60 minutes to yield a residual moisture content of 10 wt %, and the grain size fraction of 0.2 to 2 mm was screened out.

This agglomerate was dry mixed for 5 minutes at 30 rpm in a Telschig drum mixer together with 10 wt % sodium aluminum silicate having an average particle size of 3 μm and a whiteness (R 457) of 95% (zeolite A; commercial product Wessalith P from Degussa). Due to this gentle mixing operation, a dust-free agglomerate having a surface that was completely covered with sodium aluminum silicate was obtained. The whiteness of the agglomerate was improved from 48% to 60% due to the coating of sodium aluminum silicate.

To determine the swellability of the agglomerates, they were added by portions to graduated flasks filled with water having the following degrees of hardness: 0° dH, 10° dH, 20° dH, 30° dH and 40° dH.

The swelling was determined 1 hour after the addition of the agglomerates was concluded. Swelling was measured by reading the height of the swollen agglomerate on the scale divisions of the graduated cylinder. It was found that the swelling properties of the uncoated agglomerates became significantly worse when the water hardness was more than 20° dH, whereas the agglomerates coated according to this invention showed practically no change in swelling properties.

To determine the dispersibility, 5 g of the agglomerates were stirred into 1 liter of water at various degrees of hardness at 5 rpm and the time until the agglomerates were visually completely dispersed, i.e., until all the agglomerates had disintegrated, was measured. The agglomerates coated according to this invention disintegrated more rapidly than the uncoated agglomerates.

To confirm the correlation between the softening effect and dispersibility, a feel test was performed with hand towels in a household washing machine.

Washing conditions:

Wash temperature: 40° C.

Detergent: Commercial all-purpose detergent (Tandil®)

Dosage of bentonite agglomerate: 14%, based on the all-purpose detergent

Dosage of detergent: 7.5 g/l+ bentonite agglomerate

Water hardness: 0° dH, 10° dH, 20° dH, 30° dH and 40° dH.

Number of wash cycles: 5

Feel test: Paired comparison of terry cloth hand towels by a panel of 14 people; each person assigns a score to the softer detergent, then the points are added up and differences of more than 10 points are considered significant.

These results are summarized in Table I below:

TABLE I

| Hardness | Bentonite without zeolite A | Bentonite with 10% zeolite A |
|---|---|---|
| Swelling | | |
| 0° dH | 26 ml | 26 ml |
| 10° dH | 26 ml | 26 ml |
| 20° dH | 23 ml | 26 ml |
| 30° dH | 20 ml | 25 ml |
| 40° dH | 18 ml | 24 ml |
| Disintegration time of the agglomerate-dispersibility | | |
| 0° dH | 45 sec | 40 sec |
| 10° dH | 50 sec | 50 sec |
| 20° dH | 130 sec | 70 sec |
| 30° dH | 180 sec | 90 sec |
| 40° dH | 240 sec | 80 sec |
| Feel test (water hardness 40° dH) | | |
| Bentonite without zeolite A: | | 6 points |
| Bentonite with 10% zeolite A: | | 22 points |

EXAMPLE 2

Bentonite agglomerates were prepared as in Example 1 but they were coated with 4, 6 and 10 wt % of a synthetic sodium silicate with a layered structure and an average particle size of 5 μm (ground SKS 6, commercial product from Hoechst AG). The sodium silicate powder adhered well to the agglomerates.

EXAMPLE 3

Bentonite agglomerates were prepared as in Example 1, but the agglomerates were not dried (moisture content 25 wt %). 10 wt % of the zeolite from Example 1 (based on the dry bentonite) were added to the moist agglomerates at a low mixing speed (300 rpm). After mixing for 1 minute, the agglomerates were dried (residual moisture content 10%) and the grain fraction of 0.2 to 1.0 mm was screened out.

The whiteness of the coated agglomerates obtained according to Examples 2 and 3 and the whiteness of the white pigments are listed in Table II. The whiteness of the uncoated bentonite was 48% as in Example 1.

TABLE II

| Example No. | Type of cation exchanger | Amount of cation exchanger (%) | Whiteness of the cation exchanger (R 457) (%) | Whiteness of the coated agglomerates (R 457) (%) |
|---|---|---|---|---|
| 2 | SKS 6 | 4 | 90 | 49 |
| | | 6 | | 51 |
| | | 10 | | 57 |
| 3 | Wessalith P | 10 | 95 | 59 |

We claim:

1. A process for preparing a detergent additive comprising agglomerating a powdered smectic layered silicate by adding water at a total water content of about 20 to 40 wt %, based on the dry powder, to form moist agglomerates having an agglomerate size range of from 0.2 to 2.0 mm, mixing a powdered cation exchanger with the agglomerates without further substantial size reduction of the agglomerates until the cation exchanger covers the surface of the agglomerates to from a mixture, and drying the mixture.

2. The process of claim 1, wherein the moisture content of the agglomerates is about 7 to 13%.

3. The process of claim 1 wherein the agglomerates are dried to a residual moisture content of about 5 to 20 wt % after water is added to the powered smectite layered silicate.

4. A process for preparing a detergent additive comprising agglomerating a powered smectic layered silicate by adding water at a total water content of about 20 to 40 wt. % to form moist agglomerates, drying said moist agglomerates to residual water content of about 5 to 20 wt. %, sieving said agglomerates to obtain an agglomerate size range of from 0.2 to 2.0 mm, and mixing a powdered cationic exchanger with the agglomerates without further substantial size reduction of the agglomerates until the cation exchanger covers the surface of the agglomerates.

5. The process of claim 4 wherein the agglomerates are dried to a residual moisture content of about 5 to 20 wt % after water is added to the powdered smectite layered silicate.

* * * * *